(12) United States Patent
Shimada et al.

(10) Patent No.: US 7,627,876 B2
(45) Date of Patent: Dec. 1, 2009

(54) OPTICAL DISK APPARATUS HAVING A PLURALITY OF ELASTIC BODIES

(75) Inventors: Isao Shimada, Hyogo (JP); Seiji Yoshii, Nara (JP)

(73) Assignee: Panasonic Corp., Osaka (JP)

( * ) Notice: Subject to any disclaimer, the term of this patent is extended or adjusted under 35 U.S.C. 154(b) by 446 days.

(21) Appl. No.: 11/242,359

(22) Filed: Oct. 3, 2005

(65) Prior Publication Data
US 2006/0242659 A1 Oct. 26, 2006

(30) Foreign Application Priority Data
Apr. 22, 2005 (JP) ............................. 2005-124634

(51) Int. Cl.
G11B 33/14 (2006.01)
G11B 33/08 (2006.01)

(52) U.S. Cl. .................................... 720/651; 369/247.1

(58) Field of Classification Search ............. 369/247.1; 720/651, 688, 692, 698, 716, 694, 693; 360/97.02
See application file for complete search history.

(56) References Cited

U.S. PATENT DOCUMENTS

| | | | | |
|---|---|---|---|---|
| 5,768,249 A | * | 6/1998 | Ro et al. ...................... | 720/698 |
| 5,862,116 A | * | 1/1999 | Watanabe et al. ........... | 720/673 |
| 5,936,927 A | * | 8/1999 | Soga et al. ................... | 720/611 |
| 6,002,658 A | * | 12/1999 | Aso et al. ..................... | 720/651 |
| 6,045,113 A | * | 4/2000 | Itakura ........................ | 248/635 |
| 7,243,359 B2 | * | 7/2007 | Saito et al. ................... | 720/692 |
| 2002/0085478 A1 | * | 7/2002 | Park et al. .................... | 369/263 |
| 2003/0086358 A1 | * | 5/2003 | Park et al. .................... | 369/248 |
| 2003/0090984 A1 | * | 5/2003 | Lee et al. .................... | 369/77.1 |
| 2003/0112735 A1 | * | 6/2003 | Itakura ........................ | 369/263 |
| 2003/0161253 A1 | * | 8/2003 | Liao et al. .................... | 369/263 |
| 2005/0060731 A1 | * | 3/2005 | Aoyama et al. ............. | 720/651 |
| 2005/0210489 A1 | * | 9/2005 | Makino ....................... | 720/692 |
| 2005/0237892 A1 | * | 10/2005 | Kuo et al. ................. | 369/75.21 |

FOREIGN PATENT DOCUMENTS

JP  2004-326499 A  11/2004

* cited by examiner

Primary Examiner—Andrea L Wellington
Assistant Examiner—Adam B Dravininkas
(74) Attorney, Agent, or Firm—RatnerPrestia

(57) ABSTRACT

An optical disk device which includes a pickup module; a control board for processing the electrical signal received by a pickup from an optical disk and controlling sliding of the pickup; and a flexible cable for coupling the pickup and the control board. The pickup module includes the pickup for reading information on a recording face of the optical disk; a spindle motor for retaining and rotating the optical disk; and a frame on which the spindle motor is disposed. The control board is fixed to a chassis, and the pickup module is fixed to the chassis only via elastic bodies. The cable is disposed to be surrounded by the chassis and the pickup module.

6 Claims, 6 Drawing Sheets

OPTICAL DISK APPARATUS HAVING A PLURALITY OF ELASTIC BODIES

FIELD OF THE INVENTION

The present invention relates to optical disk devices for recording media such as CDs (Compact Discs) and DVDs (Digital Versatile Disks), and more particularly to the structures of optical disk devices built into small mobile equipment such as notebook personal computers and mobile DVD players.

BACKGROUND OF THE INVENTION

Video images and other information are increasingly being stored on portable optical recording media such as DVDs and CDs for use at diversifying places. In response to this trend, optical disk devices are being installed in small equipment such as notebook personal computers. Accordingly, a smaller and lighter optical disk drive device for installing in small mobile equipment is also needed.

The recording capacity of optical disks continues to increase year by year. Reading speeds are also becoming faster. Optical disk devices thus need to be assembled with a high degree of accuracy, and require adjustment of their settings on a control board to ensure that each part of the assembled device can demonstrate its intended performance. In the optical disk device, the pickup and control board are generally coupled by a flexible cable, and thus this cable follows the sliding of the pickup. The slight changes in load applied to the pickup in response to this movement of the cable are adjusted and optimized in the above adjustment process. Accordingly, the flexible cable coupled to the pickup is protected with several chasses in the optical disk device during transportation and attachment to prevent any change in adjustment settings.

FIG. 6 is a perspective view of the appearance of a conventional optical disk device, FIG. 7 is a perspective view of the appearance of a mobile information processing apparatus in which the optical disk device shown in FIG. 6 is installed, and FIG. 8 is a plan view of the mobile information processing apparatus seen from the bottom and with a bottom case removed.

In FIG. 6, pickup 161 reads information on the recorded face of the optical disk (not illustrated). Pickup 161 includes a laser emitter, light-receiving element, and lens for focusing a laser beam onto the recording face of the optical disk. Pickup 161 is slideably attached to frame 165. The optical disk is set on spindle motor 164, and this motor rotates the optical disk. Spindle motor 164 is fixed to frame 165. Pickup module 110 is configured with pickup 161, spindle motor 164, and frame 165.

Frame 165 is fixed to tray case 162 by multiple elastic bodies (not illustrated). A reading signal output from pickup 161 is transmitted through the flexible cable (not illustrated) extending from pickup 161 to an amplifier circuit board disposed in tray case 162. Chassis (not illustrated) is fixed to the bottom face of tray case 162 so as to protect the cable from pickup 161.

The amplifier circuit board and control board 163 are coupled using another flexible cable 166. Control board 163 is fixed to drive case 169 and coupled to the circuit board (not illustrated) of a mobile information processing apparatus via interface connector 168 on control board 163. In general, the optical disk device is fixed to the mobile information processing apparatus using metal fitting 167 attached to drive case 169.

FIG. 7 is an example of the mobile information processing apparatus in which the conventional optical disk device is installed. FIG. 8 illustrates the same mobile information processing apparatus with the outer cover removed. The operation of the conventional optical disk device is described below for the case of installation in a mobile information processing apparatus.

In FIG. 7, the optical disk device such as a CD-ROM drive device or DVD-ROM drive device is installed on the left of main body 171 of the mobile information processing apparatus. As shown in the drawing, tray case 162 to which pickup module 110 is installed slides out on pressing disk eject button 172. This allows disk 173 to be placed. When tray case 162 is housed in main body 171, spindle motor 164 rotates disk 173.

In the mobile information processing apparatus, interface connector 168 fixed to drive case 169 electrically couples control board 163 of the optical disk device shown in FIG. 6 and circuit board 181 of the mobile information processing apparatus shown in FIG. 8. This enables transmission of information read from the optical disk device to circuit board 181 of the mobile information processing apparatus.

However, in the above conventional optical disk device, tray case 162, to which pickup module 110 is attached, is fitted to drive case 169 in an unstable contact state when tray case 162 is housed inside drive case 169. As a result, when the optical disk device is used in a condition affected by external vibrations, vibrations of tray case 162 inside drive case 169 are amplified, and thus the reading and writing characteristics of the optical disk device cannot be readily secured in some cases.

To prevent degradation of these characteristics, drive case 169 is generally retained with respect to a cabinet of the mobile information processing apparatus in which the optical disk device is installed via an elastic body. In this case, however, the elastic body disposed between drive case 169 and the cabinet and the elastic body disposed between frame 165 of pickup module 110 and tray case 162 may generate resonances. Accordingly, reading and writing characteristics of the optical disk device cannot be expected to improve.

The optical disk device disclosed in Japanese Patent Unexamined Application No. 2004-326499 is fixed to the casing of the mobile information processing apparatus directly or via a cushioning material. However, in the case of this type of conventional optical disk device, the characteristics cannot be adjusted depending on various factors, such as frictional resistance during sliding of the pickup, once the optical disk device is installed in the mobile information processing apparatus. Consequently, it has been difficult to secure performance of the optical disk device to a high degree of precision.

SUMMARY OF THE INVENTION

An optical disk device of the present invention is configured as below.

The optical disk device of the present invention includes a pickup module, control board, and flexible cable.

The pickup module includes a pickup slidably disposed for reading information on a recording face by focusing a laser beam on the recording face of an optical disk; a spindle motor for retaining and rotating the optical disk; and a frame on which the spindle motor is disposed.

The control board processes electrical signals received by the pickup from the optical disk, and controls sliding of the pickup.

The flexible cable couples the pickup and control board.

The control board is fixed to a chassis. The pickup module is fixed to the chassis only via multiple elastic bodies. The cable is disposed to be surrounded by the chassis and the pickup module.

The above structure enables adjustment and application of other measures inside the optical disk device against an effect of sliding of the pickup. Accordingly, characteristics of the optical disk device can be stably secured regardless of an apparatus into which the optical disk device is assembled. In addition, vibrations affecting the pickup module can be reduced and suppressed by fixing the chassis, to which the pickup module is secured via the elastic bodies, to the mobile information processing apparatus, etc. in which the optical disk device is installed. The present invention thus offers a small and light optical disk device that can stably secure the performance of the optical disk device and protect the pickup module from external vibrations and impacts.

DETAILED DESCRIPTION OF PREFERRED EMBODIMENTS

An optical disk device in a preferred embodiment of the present invention is described next in detail, using an example of installing the optical disk device in a mobile information processing apparatus such as a notebook personal computer, with reference to drawings.

Figure 1:
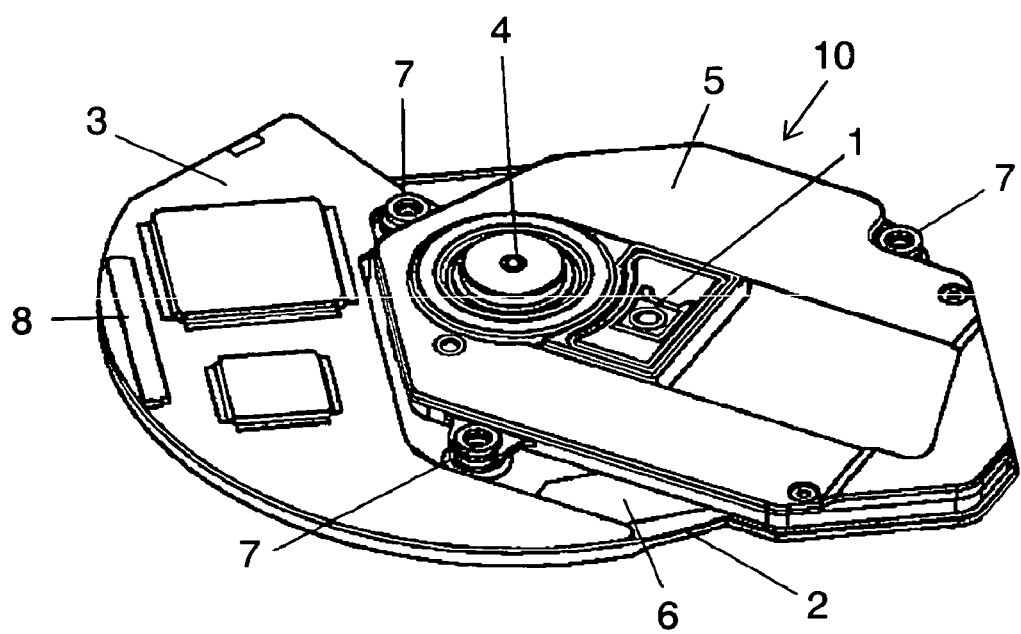
FIG. 1 is a perspective view of the appearance of an optical disk device in accordance with a preferred embodiment of the present invention.
Figure 2:
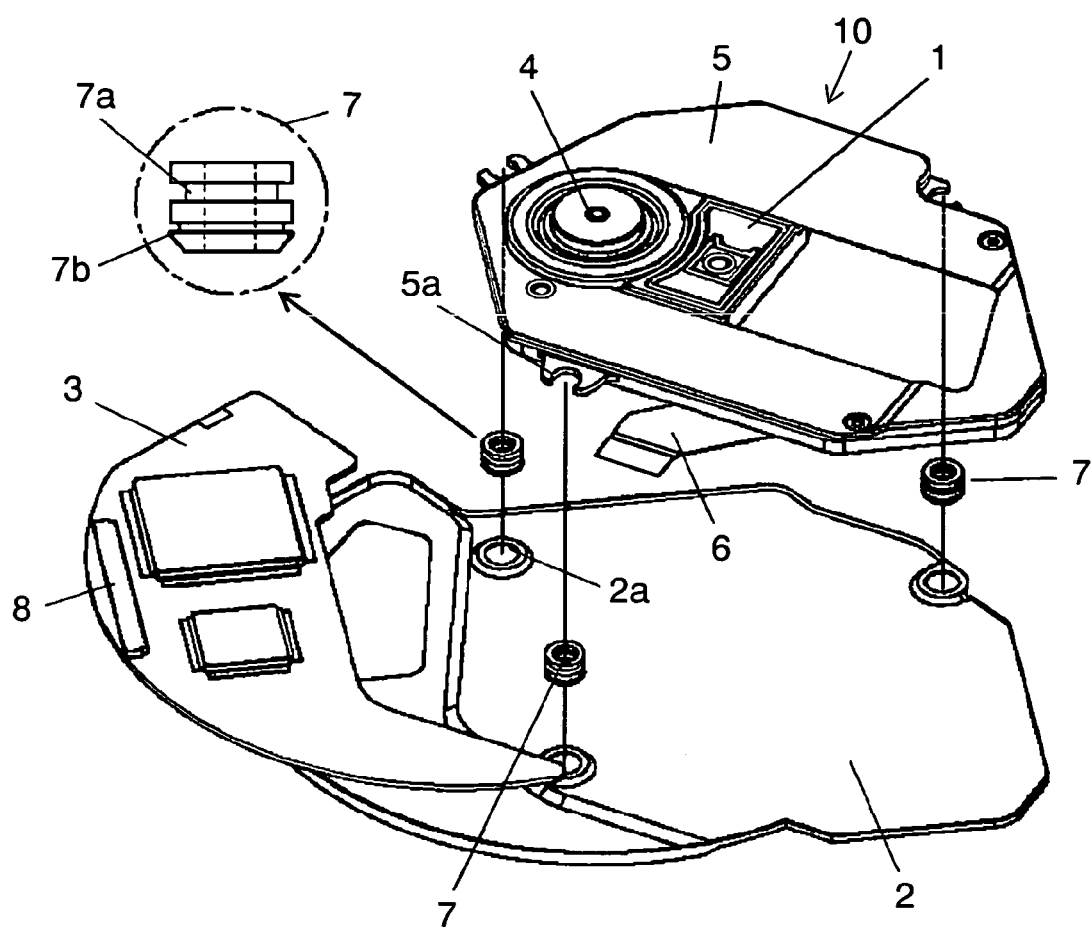
FIG. 2 is an exploded perspective view of the optical disk device in FIG. 1.
Figure 3:
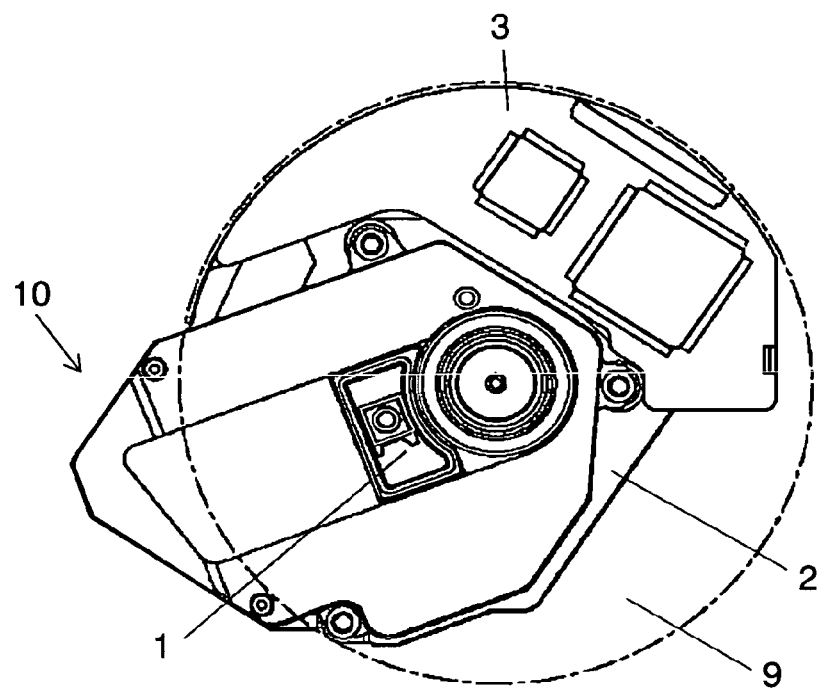
FIG. 3 is a plan view of the optical disk device in FIG. 1 seen from the top.
Figure 4:
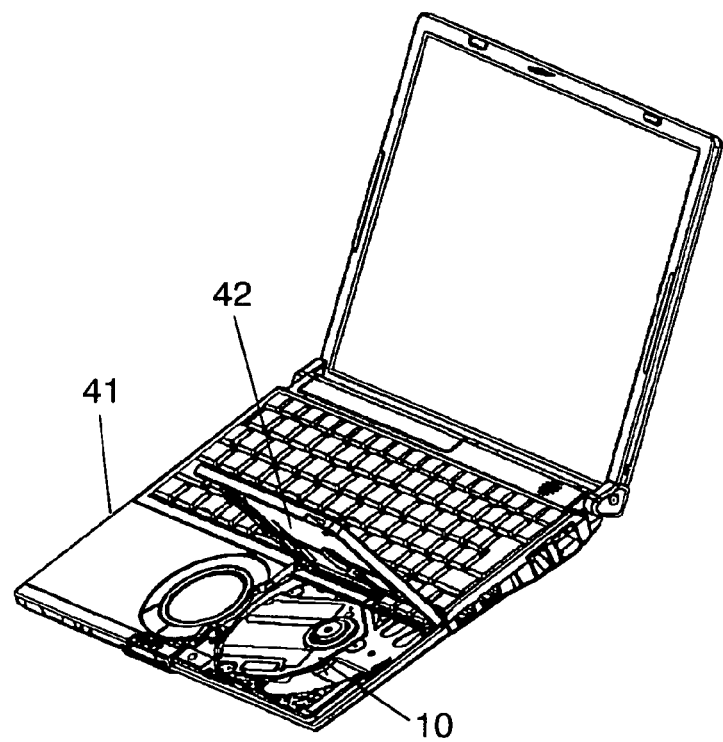
FIG. 4 is a perspective view of the appearance of a mobile information processing apparatus in which the optical disk device in FIG. 1 is installed.
Figure 5:
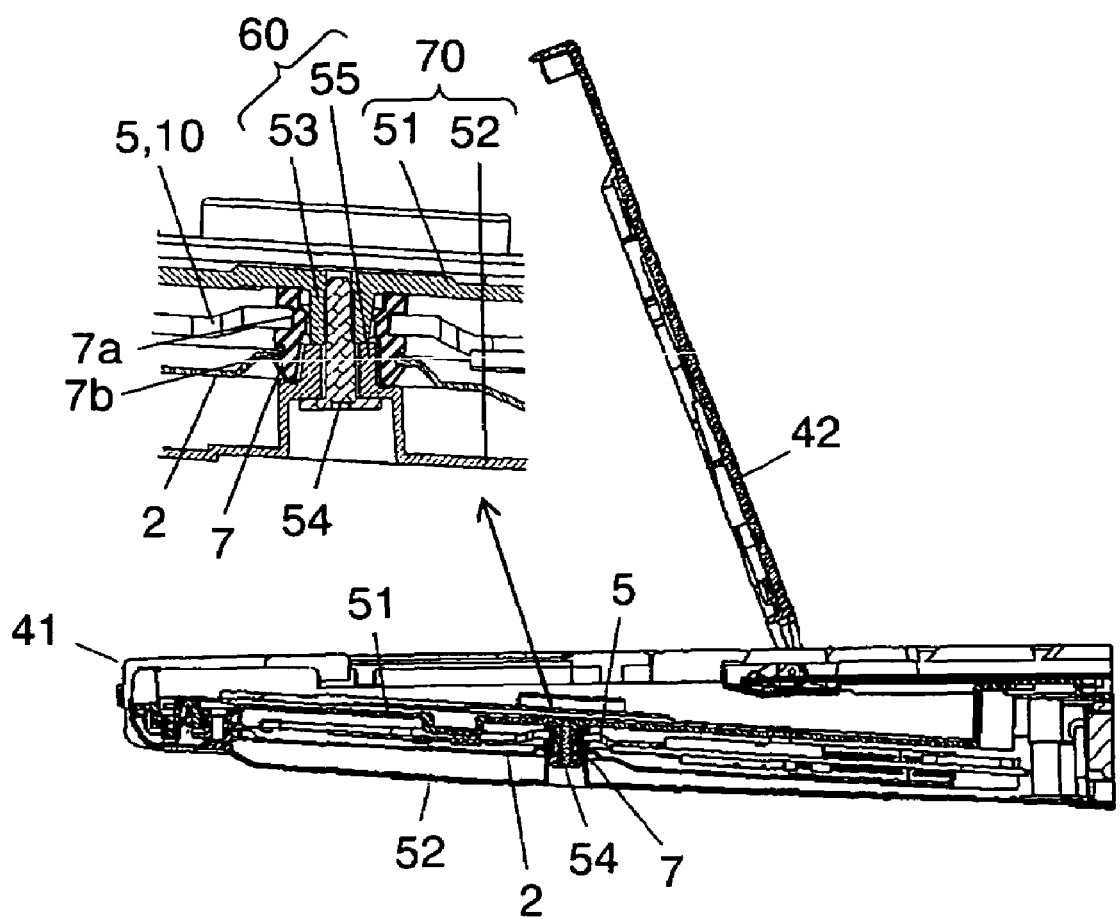
FIG. 5 is a detailed sectional view of attachment of the disk device in FIG. 1 to a main body of the mobile information processing apparatus.
Figure 6:
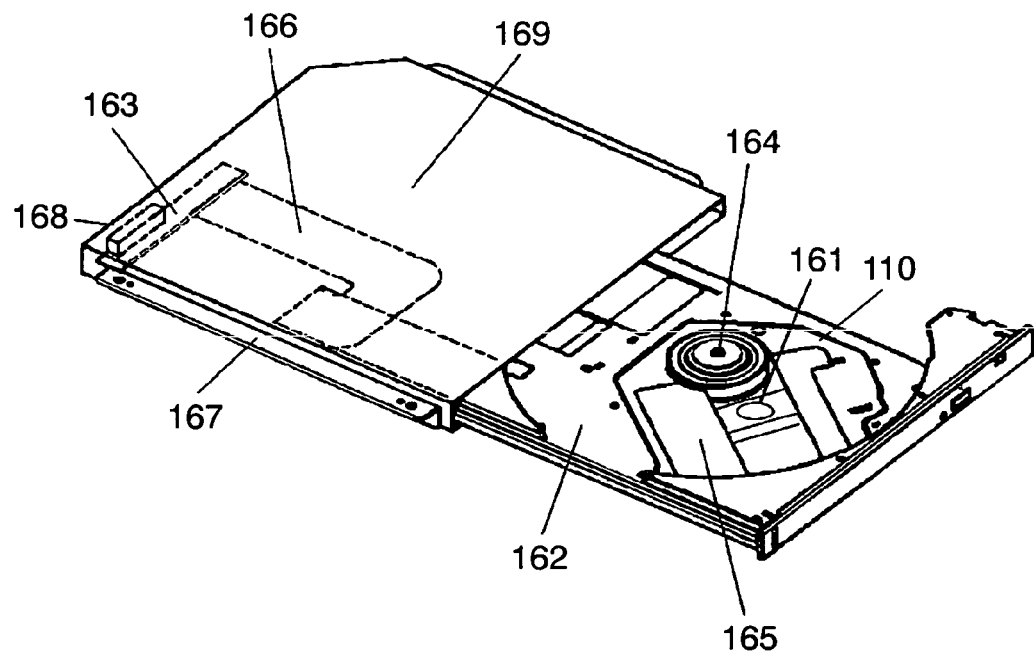
FIG. 6 is a perspective view of the appearance of a conventional optical disk device.
Figure 7:
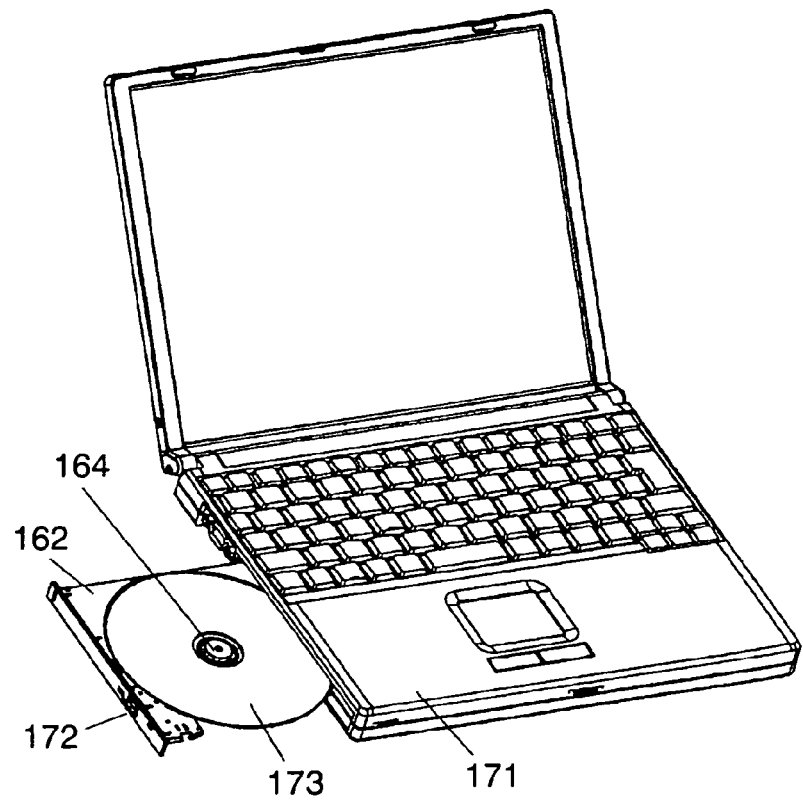
FIG. 7 is a perspective view of the appearance of the mobile information processing apparatus in which the optical disk device in FIG. 6 is installed.
Figure 8:
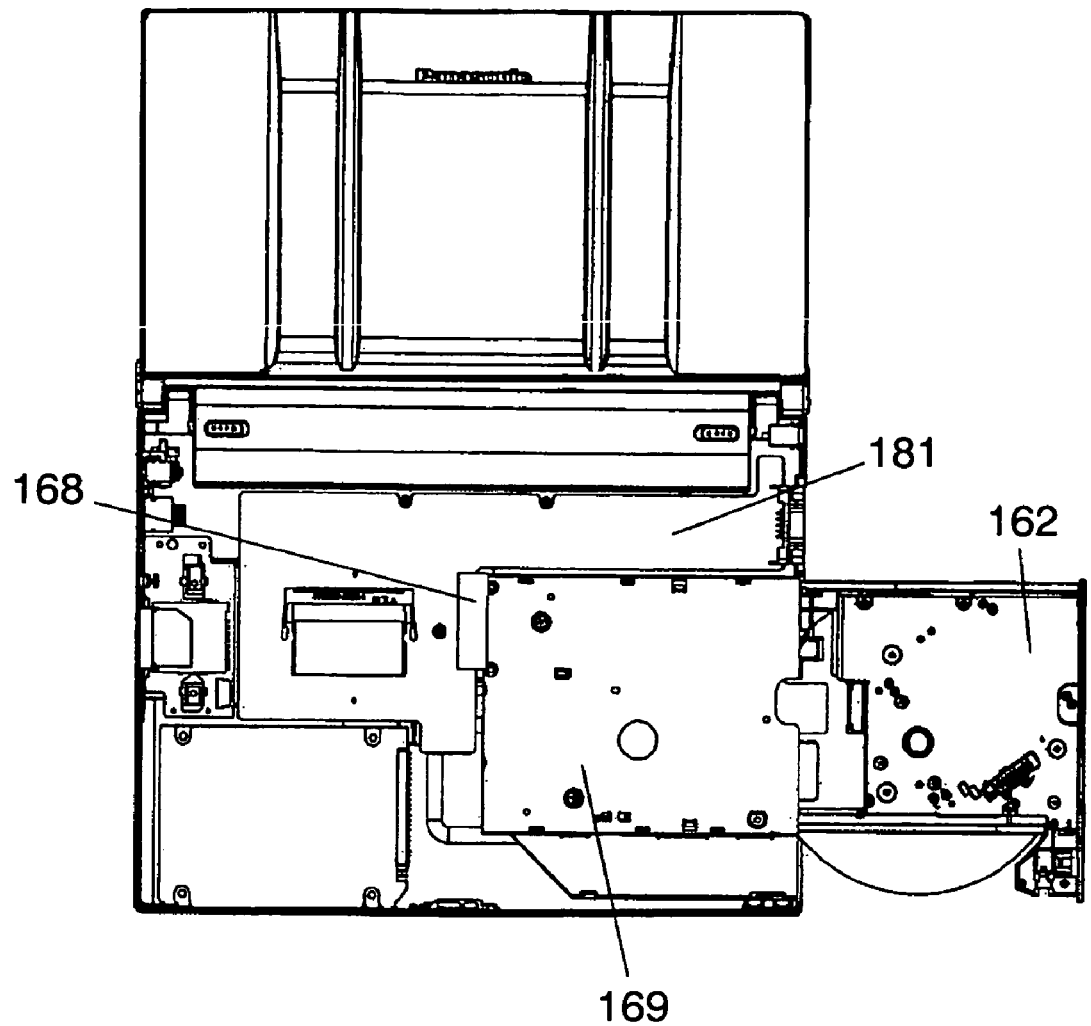
FIG. 8 is a plan view of the mobile information processing apparatus in FIG. 7 seen from the bottom and with a bottom case removed.

FIG. 1 is a perspective view of the appearance of the optical disk device in the preferred embodiment of the present invention. FIG. 2 is an exploded perspective view of the optical disk device in FIG. 1; FIG. 3 is a plan view of the optical disk device in FIG. 1 seen from the top; FIG. 4 is a perspective view of the appearance of the mobile information processing apparatus in which the optical disk device in FIG. 1 is installed, and FIG. 5 is a detailed sectional view of attachment of the disk device in FIG. 1 to the main body of the mobile information processing apparatus.

In FIG. 1, pickup 1 reads and writes information on the recording face of an optical disk that rotates while retained by spindle motor 4. For this operation, pickup 1 includes a laser emitter, a light-receiving element for receiving a laser beam emitted from the laser emitter, and a lens for focusing the laser beam onto the recording face of the optical disk. Pickup 1 is slideably attached to frame 5.

Spindle motor 4 is fixed to frame 5. Pickup module 10 is configured including pickup 1, spindle motor 4, and frame 5.

As shown in FIG. 2, a protrusion with a U-shaped notch 5a is provided at three points on the periphery of frame 5. Tubular elastic body 7 is fitted and secured in each notch 5a. More specifically, as shown inside the dashed line circle in FIG. 2, two constricted parts 7a and 7b are formed on the periphery of each elastic body 7 and form two grooves. Upper first constricted part 7a is fitted and secured to respective notches 5a at three points on frame 5. Lower constricted part 7b is fitted and secured to respective holes 2a at three points on chassis 2. In this way, pickup module 10 is flexibly secured on chassis 2 via three elastic bodies 7.

Control board 3 of the optical disk device is coupled to slideable pickup 1 using flexible cable 6. This control board 3 has a circuit for processing, such as amplifying, electrical signals received from the optical disk by pickup 1 and controlling sliding of pickup 1. In addition, interface connector 8 is disposed on control board 3. This interface connector 8 allows electrical coupling to the mobile information processing apparatus in which the optical disk device of the present invention is installed.

Control board 3 is fixed to chassis 2. More specifically, a hole (not illustrated) is created in a part of the area on chassis 2 where control board 3 is installed. Even after control board 3 is fixed on chassis 2, a contact pin can contact a test point on control board 3 for detecting its circuit signals through this hole on chassis 2.

Flexible cable 6 which couples pickup 1 and control board 3 is disposed to be surrounded by chassis 2 and pickup module 10. This structure makes cable 6 move inside the space created by chassis 2 and frame 5 of pickup module 10 in line with sliding of pickup 1. The top face of chassis 2 and a sliding face of pickup 1 are disposed roughly in parallel.

FIG. 3 is a plan view of the optical disk device in FIG. 1 seen from the top. As shown in FIG. 3, control board 3 is disposed inside the periphery of the optical disk when the optical disk is placed on pickup module 10. In other words, control board 3 has a shape that does not protrude from outline 9 of the optical disk, indicated by a dashed line in FIG. 3, when the optical disk is loaded in the optical disk device.

This structure makes it possible to dispose the optical disk device at diverse angles centering on the disk rotation axis when the optical disk device is installed in the mobile information processing apparatus. The layout of the mobile information processing apparatus to which the optical disk device of the present invention is installed can thus be designed with greater flexibility.

FIG. 4 is a perspective view of the appearance of the mobile information processing apparatus in which the optical disk device in FIG. 1 is installed. In FIG. 4, disk cover 42 is attached to main body 41 of the mobile information processing apparatus, and this disk cover 42 is configured to open and close on the top face of pickup module 10.

FIG. 5 is a detailed sectional view of the attachment of the disk device in FIG. 1 to the main body of the mobile information processing apparatus. In FIG. 5, boss 53 is created on top case 51 of cabinet 70 of the mobile information processing apparatus in which the optical disk device of the preferred embodiment is installed. Boss 55 is created on bottoms case 52 of cabinet 70. Boss 53 and boss 55 configure protrusion 60 provided on cabinet 70.

Protrusion 60 (bosses 53 and 55) on cabinet 70 passes through inside tubular elastic body 7, and this protrusion 60 (bosses 53 and 55) is tightened from inside by screw 54 passing through bottom case 52 of cabinet 70. Each elastic body 7 is tubular, and first constricted part 7a on the periphery of each elastic body 7 is fixed to frame 5. Second constricted part 7b is fixed to chassis 2. In this way, pickup module 10 is attached to cabinet 70 via three elastic bodies 7. Pickup module 10 is thus configured to contact only chassis 2 via three elastic bodies 7.

This structure has the effect of reducing the transmission of vibrations and impacts applied to the mobile information processing apparatus to the optical disk device by attaching tubular elastic body 7 in a way such that protrusion 60 provided on cabinet 70 of the mobile information processing apparatus passes it through when the optical disk device in the preferred embodiment is installed and fixed in the mobile information processing apparatus.

Frame 5 of pickup module 10 is fixed to constricted part 7a on the periphery of tubular elastic body 7, and chassis 2 is fixed to another constricted part 7b. This structure flexibly fixes pickup module 10 and chassis 2 and prevents vibrations just by three elastic bodies 7. Consequently, a smaller and lighter optical disk device can be made feasible.

In the optical disk device in the preferred embodiment, the optical disk device contacts cabinet 70 only via three elastic bodies 7 when the optical disk device is installed and fixed to cabinet 70. Other parts of the optical disk device, including frame 5 and pickup module 10, do not directly contact cabinet 70. This structure reduces the transmission of vibrations and impacts applied to the mobile information processing apparatus to the installed optical disk device.

Next, an effect of the optical disk device of the present invention is described below.

In FIG. 2, frame 5 to which pickup 1 is slideably attached and chassis 2 are disposed at a predetermined distance so as to sandwich flexible cable 6. Cable 6 is disposed to be surrounded by chassis 2 and frame 5 of pickup module 10. This allows cable 6 to move in line with sliding of pickup 1 but resistance in the movement of cable 6 is constant. Consequently, the change in load on pickup 1 according to the movement of cable 6 is also constant.

The control constant for each characteristic of assembled pickup module 10 is adjustable by operating the optical disk device in the above structure and detecting a circuit signal of control board 3 in the optical disk device through the hole on the bottom face of chassis 2. Accordingly, a small and light optical disk device that is less affected by the mobile information processing apparatus to which the optical disk device is assembled is achieved.

As shown in the preferred embodiment in FIG. 5, pickup module 10 is fixed to chassis 2 via tubular elastic bodies 7 when the optical disk device is installed in the mobile information processing apparatus. This provides a shock-absorbing structure.

Still more, a chassis made of metal can prevent transmission of electromagnetic noise from pickup 1 to cable 6.

Still more, even when the mobile information processing apparatus is placed under strain, the strain does not reach pickup module 10 since it is fixed to chassis 2 only via elastic bodies 7. Accordingly, mobile information processing apparatuses which are often exposed to external forces can be used without having detrimental effects on the performance of the optical disk device. In the preferred embodiment, three elastic bodies 7 are employed. However, it is apparent that the number of elastic bodies 7 can be two, four, or more.

As described above, the performance of the optical disk device of the present invention is secured stably, its pickup module is protected from external vibrations and impacts, and the optical disk device is made smaller and lighter. Accordingly, the optical disk device of the present invention is ideally suited for installation in mobile information processing apparatuses including notebook PCs with built-in optical disk devices such as CD drive devices and DVD drive devices, and small mobile equipment such as mobile DVD players.

An example of installing the optical disk device of the present invention in a mobile information processing apparatus is given in the above preferred embodiment. It is apparent, however, that the optical disk device of the present invention is also applicable to mobile DVD players, other mobile devices, and also to desktop equipment.

What is claimed is:

1. An optical disk assembly comprising:
    (A) an optical disk device comprising:
        (a) a pickup module comprising:
            a pickup slidably disposed for reading information on a recording face of an optical disk by focusing a laser beam on the recording face;
            a spindle motor for retaining and rotating the optical disk; and
            a frame on which the spindle motor is disposed;
        (b) a control board for processing an electrical signal received by the pickup from the optical disk, and controlling sliding of the pickup; and
        (c) a flexible cable for coupling the pickup and the control board;
        wherein the control board is fixed to a chassis;
        the pickup module is flexibly secured to the chassis only via a plurality of tubular elastic bodies, each of the elastic bodies having a first constricted part and a second constricted part formed on a periphery thereof, each of the constricted parts forming a respective groove, with the frame being flexibly secured to the first constricted part, and the chassis being flexibly secured to the second constricted part; and
        the cable is disposed to be surrounded by the chassis and the pickup module; and
    (B) a cabinet in which the optical disk device is installed, the cabinet comprising:
        top and bottom protrusions,
        wherein the pickup module of the optical disk device is mounted in the cabinet by passing the top and bottom protrusions of the cabinet through a top and bottom opening of the tubular elastic bodies, the top and bottom protrusions contiguous with each other.

2. The optical disk assembly as defined in claim 1, wherein the control board is disposed within an outer outline of the disk when the optical disk is viewed from along the axis of rotation of the disk while in plan view.

3. The optical disk assembly as defined in claim 1, wherein the pickup module is coupled to the cabinet only via the elastic bodies in a state that the optical disk device is installed in the cabinet.

4. The optical disk assembly as defined in claim 1, wherein the chassis is made of metal.

5. The optical disk assembly as defined in claim 1, wherein three elastic bodies are provided.

6. The optical disk assembly as defined in claim 1, further comprising a fastener directly connecting the top and bottom protrusions together.

* * * * *